June 18, 1957  E. L. SCHMIDT  2,796,011
COMBINATION GARDEN TOOLS AND SPRINKLER
Filed Oct. 1, 1954  2 Sheets-Sheet 1
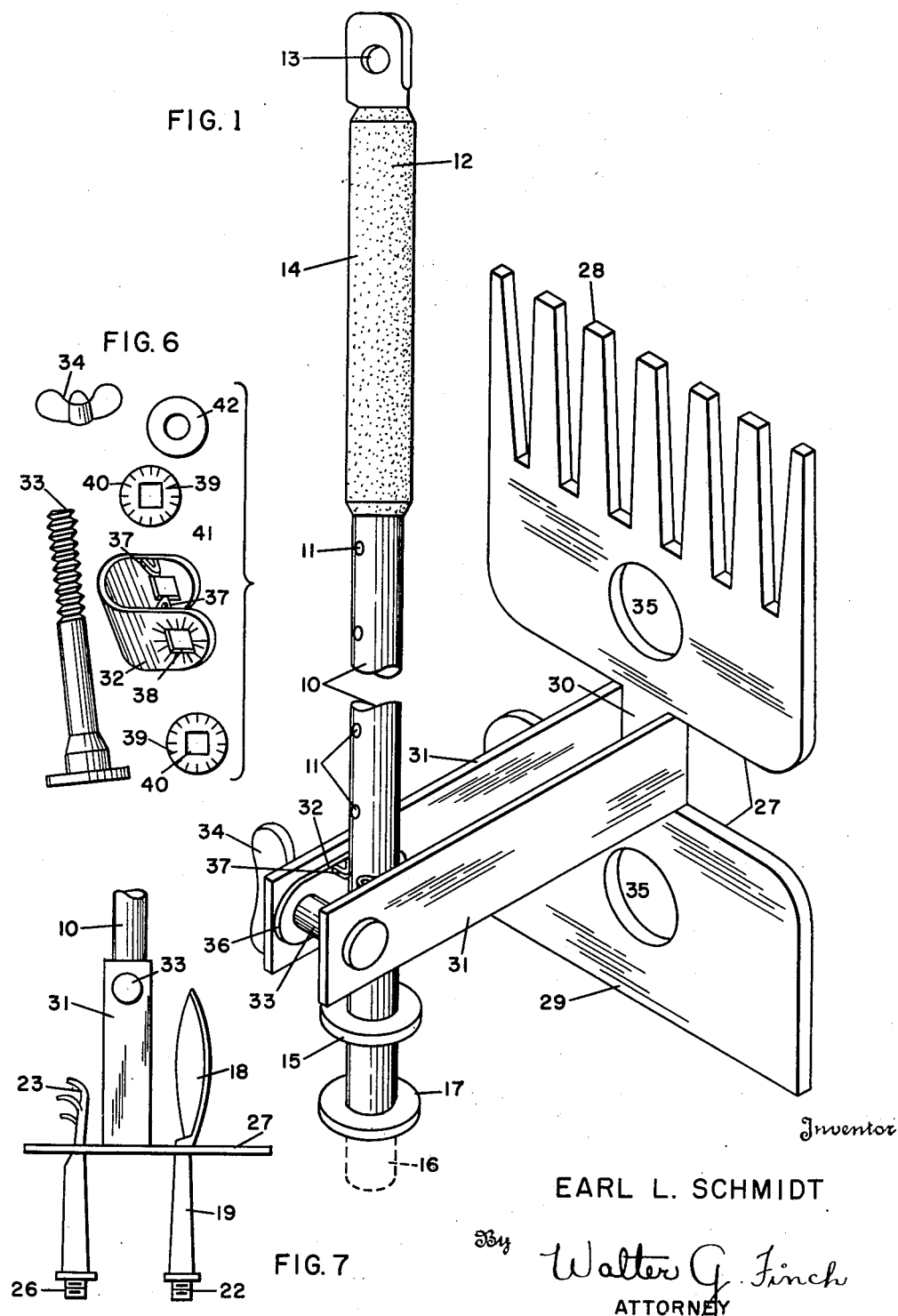
EARL L. SCHMIDT
By Walter G. Finch
ATTORNEY

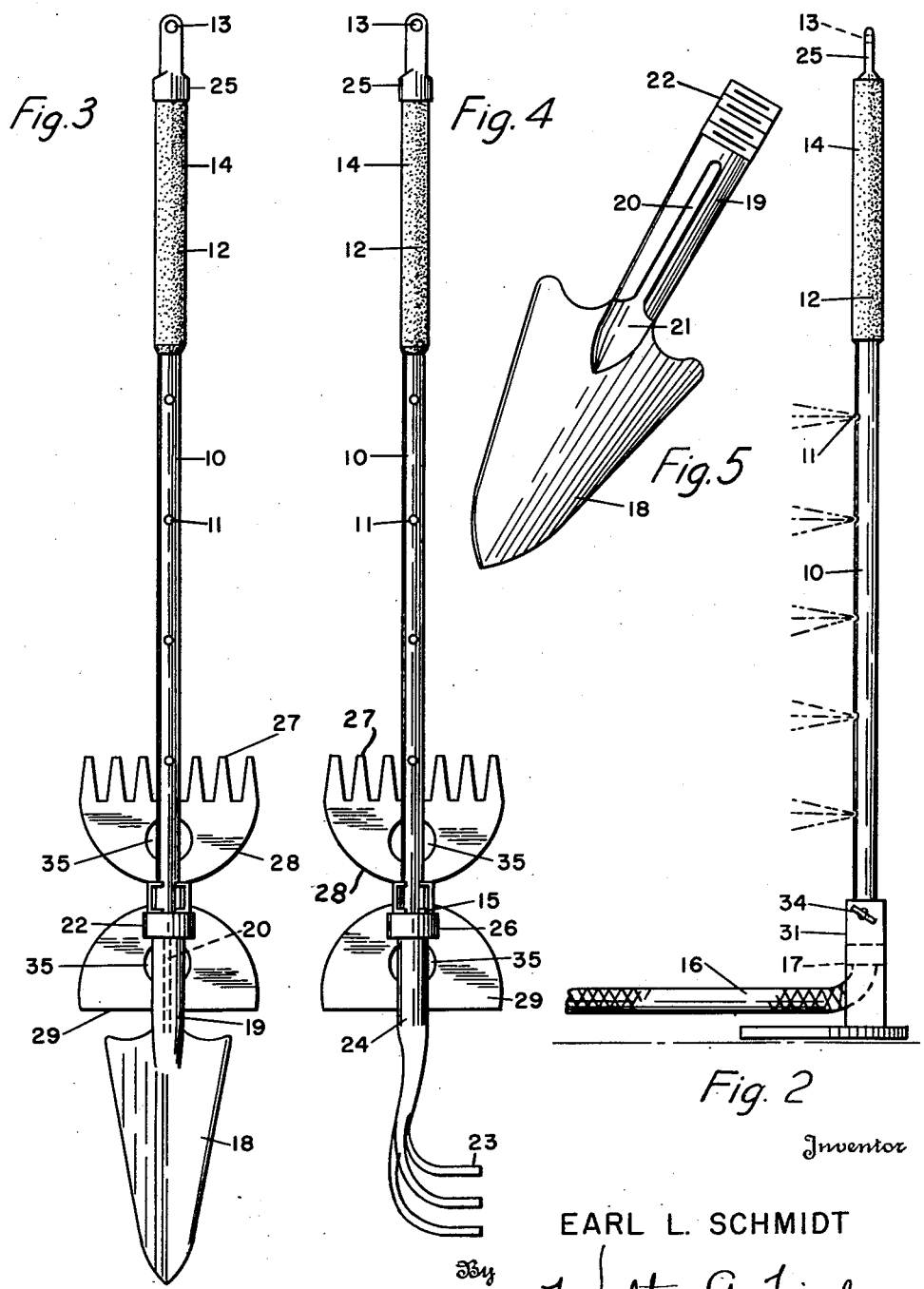

United States Patent Office 2,796,011
Patented June 18, 1957

2,796,011

COMBINATION GARDEN TOOLS AND SPRINKLER

Earl L. Schmidt, Baltimore, Md.

Application October 1, 1954, Serial No. 459,618

3 Claims. (Cl. 97—62)

This invention refers to agricultural implements and more particularly to those classified as small garden tools, and including rakes, shovels, scrapers and hose attachments.

The invention has among its objects the provision of a new and improved combination garden tool that will avoid one or more of the disadvantages and limitations of the previous art.

Another object of the invention is to provide a new and improved garden tool capable of attaching and employing a combination of tools according to choice, in a convenient and facile manner.

A further object of this invention is to provide a new and improved garden tool adapted to use a number of different field implements in an unusual and effective manner.

An additional object of the invention is to provide a new and improved hand agricultural device, that is designed to utilize and substitute various tools, such as rakes and shovels as well as afford a convenient arrangement for sprinkling water from a hose.

Still another object is to provide a new and improved garden tool designed to function in a number of desirable ways, and be compact and easily manipulated, while at the same time being relatively simple in structure and economical to manufacture.

For a clearer understanding of the invention reference is made to the accompanying drawings wherein a particular form of the invention is shown by way of example. These drawings are explained in the following description which also indicates how the device operates and the principles which govern it.

In the drawings:

Figure 1 is a view in perspective of a garden tool embodying this invention;

Figure 2 is a side elevation of the tool indicated in Figure 1 shown attached to a garden hose for sprinkling purposes in a vertical plane;

Figure 3 is a front elevation of the tool with a trowel head substituted for the hose, shown ready for use in Figure 1;

Figure 4 is a front elevation of the tool with another type of head substituted for the spade shown in Figure 3;

Figure 5 is an enlarged detail of the back view of the spade to show its construction;

Figure 6 is an exploded view in perspective of the clamp parts used in the tool head included in this embodiment of the invention; and Figure 7 is a partial elevation indicating the manner in which the removable tools can be hung in the tool head.

Similar reference characters refer to the same parts throughout the drawings.

The garden tool illustrated in the drawings consists of hollow pipe stem 10, having a number of spaced pin holes 11 drilled through its wall for sprinkling. The handle end 12 of the stem is closed by crimping it flat and perforating it with a hole 13. The hole 13 enables the tool to be suspended from a nail or hook and hang vertically. A cork or insulated covering or sleeve 14 covers the adjacent portion of the stem and provides a suitable arrangement for handling the tool. At the opposite end of the stem, a hose connection 15 is mounted. This connection enables the stem to be connected with a hose 16 and its connector 17 and the water under pressure sprinkle through the holes 11.

In place of the hose, a trowel 18, or hand cultivator 23 or similar hand tool can be attached to the hose connection 15. The trowel 18 has a handle 19. The handle 19 of the trowel 18 has a hose connector 22 at its end to permit it to be screwed on to the hose connection 15 attached to the stem 10. In the case of the Figure 4, a hand cultivator 23 is shown in place of the trowel. Its handle 24 is similar to that of the trowel 18 and has a hose attachment 26. The tool head 27 shown in Figure 1 consists of a rake 28 and a hoe 29 integrally connected to one another by a neck 30. From this neck extends a pair of narrow plates 31 bent at right angles to said neck. They are spaced apart to allow them to embrace the stem 10, with a clamping member or saddle 32 in between. The member or saddle 32 is held tightly around the stem 10 by a carriage bolt 33 and wing nut 34 located at a hole near the end of the plates. The tool head 27 can be swung through a 180° arc on the bolt as a hinge and tightened in any position selected by screwing the wing nut up tight. This enables either the rake or hoe to be used. In the positions shown in Figures 1 and 2, the hose 16 can be connected up to the hose connector 15 on the stem 10 and the water sprinkled outwardly through the holes 11. This sprinkling can be done horizontally or vertically. In each case the tool head 27 can keep the stem above the ground so the holes 11 will not be obstructed. The large holes 35 in the tool heads 27 permit the trowel or hand cultivator and other small hand tools available to be passed through and hung, as indicated in Figure 7.

It is not necessary to outline how the tools and tool heads are used agriculturally, as the manner of doing so is well known. However, it can be noted that the device is convenient and relatively light. The cork or insulated covering 14 permits the use of a metal or heat conducting pipe, without inconvenience in cold or hot weather. Also it affords electrical protection. It enables water to be directed at the ground during the use of the tools selected at the particular time, and when not in use, can be hung up readily and drained. The attachments offer great flexibility in the use of the device, as they are easily and quickly interchanged to suit the operator. It is very simple in construction and its parts are of standard forms and elements, offering economical possibilities in its manufacture.

The clamp 32 includes an inner resilient saddle 36 quasi-U form designed to embrace the cylindrical pipe stem 10, particularly by ledges 37 at the top and bottom. These ledges 37 are curved to fit the arc of the stem and serve as clamps about the latter. Holes 38 of rectangular contour are provided in the sides or walls of the saddle 36 located beyond the ledges so as to allow the carriage bolt 33 to exert leverage when it is tightened up through the use of the wing nut 34. Washers 39 are placed against the outside of the saddle 36 so their radial serrations 40 will engage with the similar serrations 41 on the outside face of the saddle. The purpose of the serrations is to bind the saddle and stem firmly in place and meet the severest requirements involved in the normal use of the device and its tools. At the same time the saddle clamp is easily adjusted. A plain washer 42 is used under the wing-nut 34 to distribute the pressure.

While the illustrations in this application are limited, it is not desired to restrict the design, construction and use of the invention to those shown, as it is appreciated that other constructions could be made and used that would employ the same principles and come within the scope of the appended claims.

Having thus described the invention what is claimed is:

1. A garden tool comprising a hollow handle closed at one of its opposite ends and provided with a straight line of perforations extending longitudinally of said handle and communicating with the interior thereof, a hose connection mounted on the other of said ends of the handle, a tool head in the form of a flat plate and shaped to provide a rake element and a hoe element connected together by a narrow neck, and means for pivotally and removably attaching said tool head to said handle to place either the teeth of said rake or the outer edge of said hoe in position to engage to enter the ground and cooperate with a hose when attached to said hose connection to maintain said handle in a vertically extending position for discharging sprinkling water in a plurality of streams from said handle.

2. A garden tool of the type specified in claim 1, in which the means for attaching the tool head to the hollow handle comprises a pair of narrow plates bent from said neck and extending in parallelism therefrom and a bolt extending through said plates and said handle to permit said tool head to be swung about said bolt from a first position in which only one of said elements engages the ground to a second position in which both of said elements engage the ground or a third position in which only the other of said elements engages the ground.

3. A garden tool of the type specified in claim 2, including a saddle member located between the ends of said plates and said handle to prevent undesired swinging movement of said tool head around said bolt.

References Cited in the file of this patent

UNITED STATES PATENTS

| | | |
|---|---|---|
| Re. 6,419 | Johnson | May 4, 1875 |
| 977,604 | Deussen | Dec. 6, 1910 |
| 1,050,685 | Peacock | Jan. 14, 1913 |
| 1,264,556 | Postel | Apr. 30, 1918 |
| 1,722,455 | Coles | July 30, 1929 |
| 2,564,489 | Malin | Aug. 14, 1951 |
| 2,695,812 | Harz | Nov. 30, 1954 |